United States Patent
Lei

(10) Patent No.: US 10,623,135 B2
(45) Date of Patent: Apr. 14, 2020

(54) FLEXIBLE UPLINK/DOWNLINK TRANSMISSIONS IN A WIRELESS COMMUNICATION SYSTEM

(71) Applicant: Lenovo Innovations Limited (Hong Kong), Hong Kong (CN)

(72) Inventor: Haipeng Lei, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/752,534

(22) PCT Filed: Aug. 14, 2015

(86) PCT No.: PCT/CN2015/086925
§ 371 (c)(1),
(2) Date: Feb. 13, 2018

(87) PCT Pub. No.: WO2017/027999
PCT Pub. Date: Feb. 23, 2017

(65) Prior Publication Data
US 2019/0013898 A1 Jan. 10, 2019

(51) Int. Cl.
H04L 1/00 (2006.01)
H04W 72/04 (2009.01)
H04W 72/14 (2009.01)

(52) U.S. Cl.
CPC ......... H04L 1/0007 (2013.01); H04W 72/042 (2013.01); H04W 72/0406 (2013.01); H04W 72/0446 (2013.01); H04W 72/14 (2013.01)

(58) Field of Classification Search
None
See application file for complete search history.

(56) References Cited

U.S. PATENT DOCUMENTS

| 2009/0180410 | A1  | 7/2009  | Lee et al. |
| 2013/0142268 | A1* | 6/2013  | Gao ....................... H04W 76/14 375/252 |
| 2014/0064212 | A1* | 3/2014  | Ko .......................... H04W 4/80 370/329 |
| 2015/0304096 | A1* | 10/2015 | Sahlin .................. H04B 7/2615 370/280 |
| 2016/0329993 | A1* | 11/2016 | Kim ..................... H04W 52/365 |
| 2018/0176956 | A1* | 6/2018  | Koutsimanis ..... H04W 74/0816 |

FOREIGN PATENT DOCUMENTS

| CN | 103108328 A   | 5/2013 |
| WO | 2010086498 A1 | 8/2010 |
| WO | 2012019348 A1 | 2/2012 |
| WO | 2014110782 A1 | 4/2014 |

\* cited by examiner

Primary Examiner — Diane L Lo
(74) Attorney, Agent, or Firm — Kunzler Bean & Adamson

(57) ABSTRACT

Apparatuses, methods, and systems are disclosed for flexible uplink/downlink transmissions. One apparatus includes a processor and a memory that stores code executable by the processor. The code, in various embodiments, includes code that determines a frame period length for communication with a user equipment. In a further embodiment, the code includes code that determines an uplink/downlink split pattern to use with the determined frame period length. In certain embodiments, the code includes code that forms at least one message indicating the frame period length and the uplink/downlink split pattern. The apparatus may include a transmitter that provides the at least one message to the user equipment.

20 Claims, 7 Drawing Sheets

| 400 | | 0 | 1 | 2 | 3 | 4 | 5 | 6 | 7 | 8 | 9 |
|---|---|---|---|---|---|---|---|---|---|---|---|
| | CONFIG 0 | U | U | U | U | U | U | U | U | U | U |
| | CONFIG 1 | U | U | U | U | U | U | U | U | U | D |
| | CONFIG 2 | U | U | U | U | U | U | U | U | D | D |
| | CONFIG 3 | U | U | U | U | U | U | U | D | D | D |
| | CONFIG 4 | U | U | U | U | U | U | D | D | D | D |
| | CONFIG 5 | U | U | U | U | U | D | D | D | D | D |
| | CONFIG 6 | U | U | U | U | D | D | D | D | D | D |
| | CONFIG 7 | U | U | U | D | D | D | D | D | D | D |
| | CONFIG 8 | U | U | D | D | D | D | D | D | D | D |
| | CONFIG 9 | U | D | D | D | D | D | D | D | D | D |
| | CONFIG 10 | D | D | D | D | D | D | D | D | D | D |

| | Frame Period Length 502 | | Config Number 504 | | Last Subframe Indicator 506 | |

FIG. 5

FLEXIBLE UPLINK/DOWNLINK TRANSMISSIONS IN A WIRELESS COMMUNICATION SYSTEM

FIELD

The subject matter disclosed herein relates generally to wireless communications and more particularly relates to flexible uplink/downlink transmissions in a wireless communication system.

BACKGROUND

The following abbreviations are herewith defined, at least some of which are referred to within the following description.
   3GPP Third Generation Partnership Project
   CCA Clear Channel Assessment
   CSS Common Search Space
   DL Downlink
   ECCA Extended Clear Channel Assessment
   eNB Evolved Node B
   ETSI European Telecommunications Standards Institute
   FBE Frame Based Equipment
   FDMA Frequency Division Multiple Access
   LAA Licensed Assisted Access
   LBE Load Based Equipment
   LBT Listen Before Talk
   LTE Long Term Evolution
   MCS Modulation and Coding Scheme
   MU-MIMO Multi-User, Multiple-Input, Multiple-Output
   OFDM Orthogonal Frequency Division Multiplexing
   PCell Primary Cell
   PUSCH Physical Uplink Shared Channel
   QoS Quality of Service
   RRC Radio Resource Control
   SC-FDMA Single Carrier Frequency Division Multiple Access
   SCell Secondary Cell
   TBS Transport Block Size
   TDD Time-Division Duplex
   TDM Time Division Multiplex
   UE User Entity/Equipment (Mobile Terminal)
   UL Uplink
   UMTS Universal Mobile Telecommunications System
   WiMAX Worldwide Interoperability for Microwave Access In Wireless Communications networks, for example, in LTE systems using LAA, an unlicensed spectrum is used with assistance from a licensed carrier. LAA may facilitate a fair coexistence with other technologies over the unlicensed spectrum and satisfy various regulatory requirements in different countries and regions.

For regulation requirements in Europe, ETSI has specified two channel access mechanism (i.e., FBE and LBE). For these two channel access mechanisms, before starting transmissions on an operating channel, the equipment (i.e., FBE and LBE) may perform a CCA check by using energy detection with the CCA observation time not less than 20 microseconds ("us"). If the energy level in the channel does not exceed a predefined threshold corresponding to the power level, the equipment may consider the operating channel to be clear and may transmit immediately. In contrast, the equipment may consider the operating channel to be occupied and may continue to perform the CCA check. For FBE, the equipment may continue to perform the CCA check at an end of a frame period. For LBE, the equipment may start performing ECCA immediately until it can grab the channel. In some situations, LBE may have a higher channel access probability than FBE.

Although LBE may have a higher channel access probability than FBE, FBE may be more appropriate for LAA UL. For example, FBE can follow the LTE UL framework that a UE's UL transmission should be permitted by a serving eNB, FBE can avoid inter-UE blocking and enable UL multiplexing of multiple UEs in one subframe by FDMA and MU-MIMO, FBE does not require a reservation signal, and FBE has a fixed timing relationship and UL transmission can always start from the first OFDM symbol of a subframe. Accordingly, in certain configurations, FBE may be used as a baseline for LAA UL operation. In contrast, LBE may be more appropriate for LAA DL.

FBE may have certain drawbacks. For example, in certain implementations, the frame period in FBE is related to the performance of LAA UL. In such configurations, fixed LAA DL/UL scheduling may decrease throughput. Furthermore, in one configuration, long frame periods may limit opportunities to use the unlicensed band. In addition, FBE may have a large overhead due to the reservation of the idle period at the end of each frame period.

Seven TDD uplink/downlink configurations with 5 millisecond ("ms") or 10 ms DL-to-UL switching-point periodicity have been defined for TDD systems. However, because of regulatory requirements due to LBT rules and the traffic adaptation in UL and DL, the seven existing TDD uplink/downlink configurations may not facilitate efficient DL and UL resource usage in LAA.

BRIEF SUMMARY

Apparatuses for flexible uplink/downlink transmissions are disclosed. Methods and systems also perform the functions of the apparatus. In one embodiment, the apparatus includes a processor and a memory that stores code executable by the processor. The code, in various embodiments, includes code that determines a frame period length for communication with a user equipment. In a further embodiment, the code includes code that determines an uplink/downlink split pattern to use with the determined frame period length. In certain embodiments, the code includes code that forms at least one message indicating the frame period length and the uplink/downlink split pattern. The apparatus may include a transmitter that provides the at least one message to the user equipment.

In a further embodiment, the code that determines the frame period length for communication with the user equipment includes code that selects the frame period length from multiple frame period lengths. In some embodiments, the code that determines the uplink/downlink split pattern to use with the frame period length includes code that selects the uplink/downlink split pattern from multiple uplink/downlink split patterns. In such embodiments, each uplink/downlink split pattern includes consecutive uplink subframes grouped together followed by consecutive downlink subframes grouped together with no gap between the uplink subframes and the downlink subframes. In another embodiment, the at least one message comprises a downlink grant message having a bit that indicates whether a last downlink subframe in a frame period is a full subframe for downlink transmission or a partial subframe for downlink transmission.

A method for flexible uplink/downlink transmission, in one embodiment, includes determining, by use of a processor, a frame period length for communication with a user equipment. In some embodiments, the method includes determining an uplink/downlink split pattern to use with the determined frame period length. In a further embodiment, the method includes forming at least one message indicating the frame period length and the uplink/downlink split pattern. In certain embodiments, the method includes providing the at least one message to the user equipment.

In some embodiments, determining the frame period length for communication with the user equipment includes selecting the frame period length from predefined or RRC signaling configured sets comprising multiple frame period lengths. In one embodiment, determining the uplink/downlink split pattern to use with the frame period length includes selecting the uplink/downlink split pattern from multiple uplink/downlink split patterns. In such an embodiment, each uplink/downlink split pattern includes consecutive uplink subframes grouped together and consecutive downlink subframes grouped together without a gap between the uplink and downlink subframes.

In some embodiments, the uplink/downlink split pattern is indicated in downlink grant signaling or uplink grant signaling to one user equipment or in common search space of predefined subframes of one predefined licensed carrier to more than one user equipment. In other embodiments, each uplink/downlink split pattern begins with an uplink subframe.

In certain embodiments, the multiple uplink/downlink split patterns include: a first pattern including ten uplink subframes; a second pattern including nine uplink subframes followed by one downlink subframe; a third pattern including eight uplink subframes followed by two downlink subframes; a fourth pattern including seven uplink subframes followed by three downlink subframes; a fifth pattern including six uplink subframes followed by four downlink subframes; a sixth pattern including five uplink subframes followed by five downlink subframes; a seventh pattern including four uplink subframes followed by six downlink subframes; an eighth pattern including three uplink subframes followed by seven downlink subframes; a ninth pattern including two uplink subframes followed by eight downlink subframes; a tenth pattern including one uplink subframe followed by nine downlink subframes; and an eleventh pattern including ten downlink subframes.

In some embodiments, forming the at least one message indicating the frame period length and the uplink/downlink split pattern includes forming an L1 signaling message indicating the frame period length and the uplink/downlink split pattern. In certain embodiments, the method includes forming the at least one message to indicate whether a last downlink subframe in a frame period is a full subframe for downlink transmission or a partial subframe for downlink transmission. In one embodiment, the method includes determining whether the last downlink subframe in the frame period is a full subframe for downlink transmission or a partial subframe for downlink transmission. In such an embodiment, the last downlink subframe in the frame period is determined to be a full subframe for downlink transmission if a first subframe in a next frame period that follows the frame period is a downlink subframe and the last downlink subframe in the frame period is determined to be a partial subframe for downlink transmission if the first subframe in the next frame is an uplink subframe.

In one embodiment, an apparatus includes a receiver that receives at least one message, a processor, and a memory. The memory may store code executable by the processor. In a further embodiment, the code may include code that determines a frame period length for communication based on the at least one message. In certain embodiments, the code may include code that determines an uplink/downlink split pattern based on the at least one message. The apparatus, in one embodiment, includes a transmitter that transmit uplink subframes based on the frame period length and the uplink/downlink split pattern. In certain embodiments, the receiver receives downlink subframes based on the frame period length and the uplink/downlink split pattern.

Another method for flexible uplink/downlink transmission, in one embodiment, includes receiving, by use of a processor, at least one message. In some embodiments, the method includes determining a frame period length for communication based on the at least one message. In a further embodiment, the method includes determining an uplink/downlink split pattern based on the at least one message. In one embodiment, the method includes transmitting uplink subframes based on the frame period length and the uplink/downlink split pattern. In another embodiment, the method includes receiving downlink subframes based on the frame period length and the uplink/downlink split pattern.

In some embodiments, the uplink/downlink split pattern includes consecutive uplink subframes grouped together and consecutive downlink subframes grouped together with no gap between the uplink subframes and the downlink subframes. In one embodiment, the at least one message indicates whether a last downlink subframe in a frame period is a full subframe for downlink transmission or a partial subframe for downlink transmission. In certain embodiments, the uplink/downlink split pattern is indicated in downlink grant signaling or uplink grant signaling to one user equipment or in common search space of predefined subframes of one predefined licensed carrier to more than one user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 illustrates one embodiment of uplink/downlink split patterns that facilitate flexible uplink/downlink transmissions;

FIG. 5 is a schematic block diagram illustrating one embodiment of at least one message transmitted from a base unit to a remote unit;

DETAILED DESCRIPTION

Figure 1:
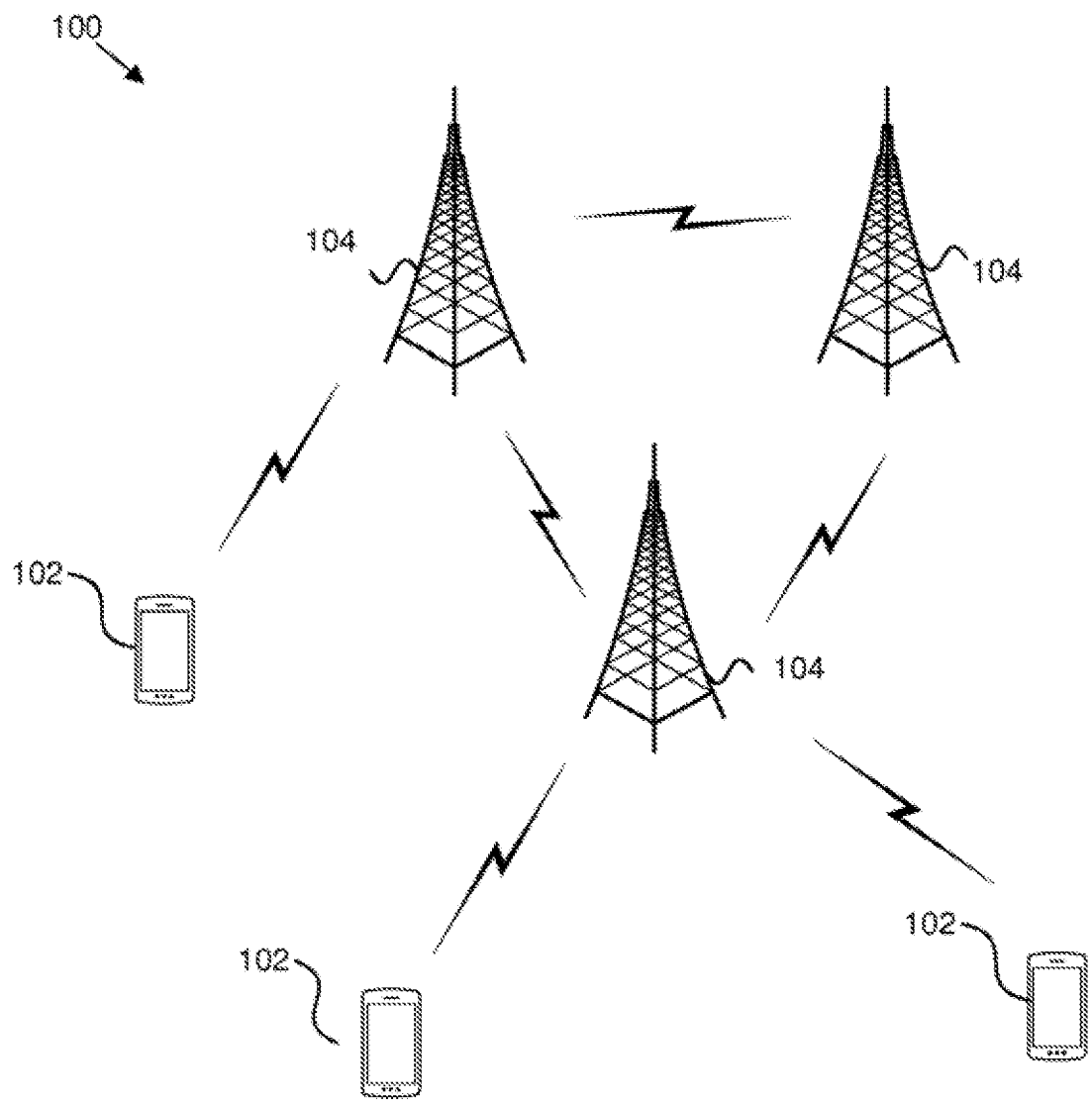
FIG. 1 is a schematic block diagram illustrating one embodiment of a wireless communication system for flexible uplink/downlink transmissions.

As will be appreciated by one skilled in the art, aspects of the embodiments may be embodied as a system, apparatus, method, or program product. Accordingly, embodiments may take the form of an entirely hardwire embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in the specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program product according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagram block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for flexible uplink/downlink transmissions. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, or by other terminology used in the art. The remote units 102 may communicate directly with one or more of the base units 104 via UL communications signals.

The base units 104 may be distributed over a geographic region. In certain embodiments, a base unit 104 may also be referred to as an access point, an access terminal, a base, a base station, a Node-B, an eNB, a Home Node-B, a relay node, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP UMTS protocol, wherein the base unit 104 transmit using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determine a frame period length for communication with a remote unit 102. The base unit 104 may determine an uplink/downlink split pattern to use with the determined frame period length. Moreover, the base unit 104 form at least one message indicating the frame period length and the uplink/downlink split pattern. In addition, the base unit 104 may provide the at least one message to the remote unit 102. In certain embodiments, the remote unit 102 may receive the at least one message. In addition, the remote unit 102 may determine the frame period length for communication based on the at least one message. Furthermore, the remote unit 102 may determine the uplink/downlink split pattern based on the at least one message. The remote unit 102 may transmit UL subframes based on the frame period length and the uplink/downlink split pattern. The remote unit 102 may also receive DL subframes based on the frame period length and the uplink/downlink split pattern.

Figure 2:
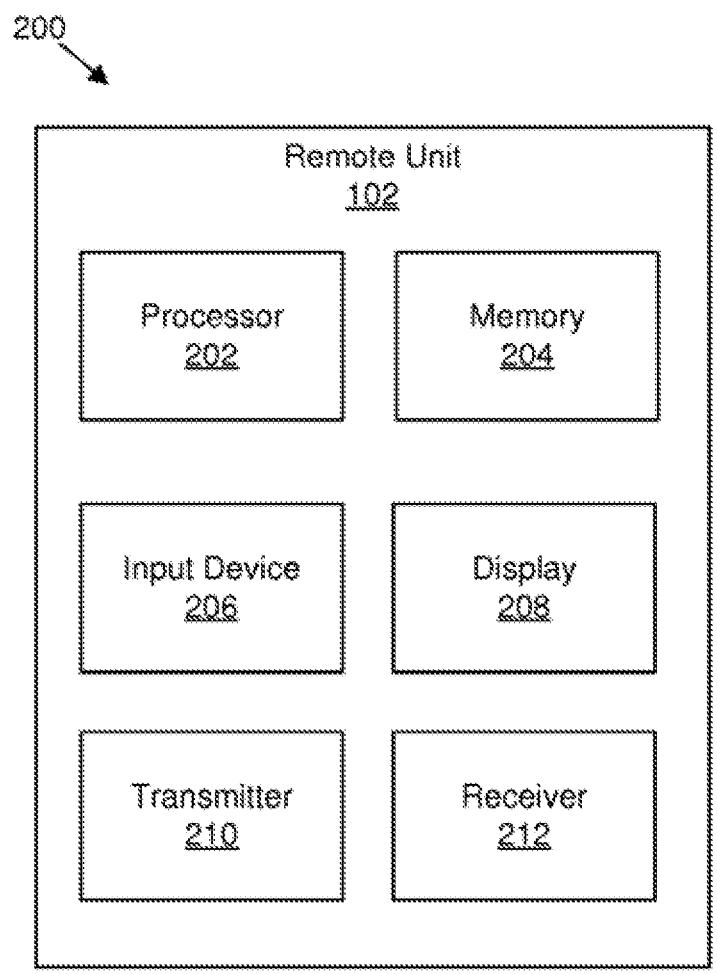
FIG. 2 is a schematic block diagram illustrating one embodiment of an apparatus that may be used for flexible uplink/downlink transmissions.

FIG. 2 depicts one embodiment of an apparatus 200 that may be used for flexible uplink/downlink transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to frame period lengths and/or uplink/downlink split patterns. In some embodiments, the memory 204 also stores program code and related data, such as an operating system, or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, and LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen of similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit UL subframes based on a frame period length and an uplink/downlink split pattern. In another embodiment, the receiver 212 may receive at least one message sent by the base unit 104. Furthermore, the receiver 212 may receive DL subframes based on the frame period length and the uplink/downlink split pattern. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
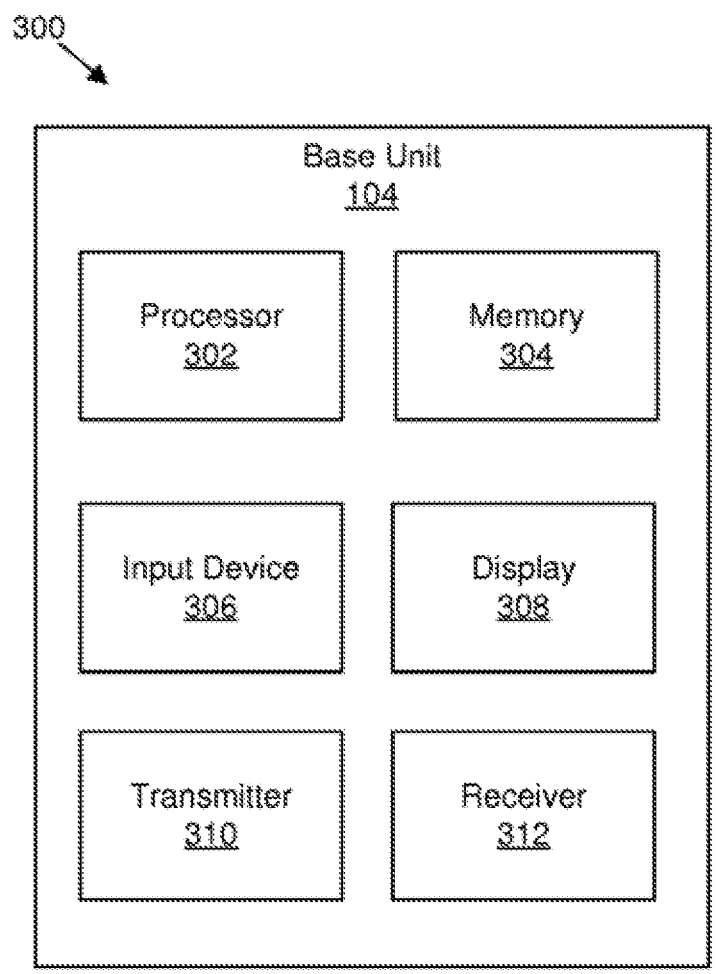
FIG. 3 is a schematic block diagram illustrating another embodiment of an apparatus that may be used for flexible uplink/downlink transmissions.

FIG. 3 depicts another embodiment of an apparatus 300 that may be used for flexible uplink/downlink transmissions. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The transmitter 310 is used to provide DL communication signals to the remote unit 102 and the receiver 312 is used to receive UL communication signals from the remote unit 102. In one embodiment, the transmitter 310 is used to provide at least one message to the remote unit 102 (e.g., UE). Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

FIG. 4 depicts one embodiment of uplink/downlink split patterns 400 that facilitate flexible uplink/downlink transmissions. As illustrated, the uplink/downlink split patterns 400 include up to eleven split pattern configurations 402 (e.g., config 0, config 1, config 2, config 3, config 4, config 5, config 6, config 7, config 8, config 9, and config 10). Certain embodiments may include a greater number or fewer number of configurations. Each split pattern configuration 402 may include up to ten subframes 404 (e.g., subframes 0, 1, 2, 3, 4, 5, 6, 7, 8, and 9) in the illustrated embodiment; however, other embodiments may include a greater number of subframes. Although the ten subframes 404 are numbered with 0-9, it should be noted that for frame period lengths that are less than ten, the first subframe in the frame period length may be considered subframe 0 and each successive subframe number may increase by one. In one embodiment, the base unit 104 may select the split pattern configuration 402 to use, such as based on an amount of UL and DL traffic.

The base unit 104 may also select a frame period length to be used with the split pattern configuration 402. For example, the base unit 104 may select a first frame period length 406 that is 10 ms and includes ten subframes. Furthermore, the base unit 104 may select a second frame period length 408 that is 5 ms and includes five subframes. Although the subframes 404 for the second frame period length 408 are labeled as "5" through "9," they may actually be considered as subframes "0" through "4." Moreover, the base unit 104 may select a third frame period length 410 that is 4 ms and includes four subframes. Although the subframes 404 for the third frame period length 410 are labeled as "6" through "9," they may actually be considered as subframes "0" through "3." In addition, the base unit 104 may select a fourth frame period length 412 that is 2 ms and include two subframes. Although the subframes 404 for the fourth frame period length 412 are labeled as "8" and "9," they may actually be considered as subframes "0" and "1." Even though they are not illustrated, there may be other frame period lengths, such as 1 ms, 3 ms, 6 ms, 7 ms, 8 ms, 9 ms, and so forth.

It should be noted that while there are eleven split pattern configurations 402 for the first frame period length 406, there are six split pattern configurations 402 for the second frame period length 408, five split pattern configurations 402 for the third frame period length 410, and three split pattern configurations 402 for the fourth frame period length 412.

Each of the split pattern configurations 402 are explained in greater detail below. For each of the split pattern configurations 402, any UL subframes are grouped together and occur before any DL subframes, which are also grouped together. Moreover, for each frame period length, the first split pattern configuration 402 includes only UL data and the last split pattern configuration 402 includes only DL data. Specifically, the "config 0" split pattern configuration 402 includes only UL data.

Within labeled subframe 9, UL data occupies only a part of the subframe because at least 5% of the maximum channel occupancy time is reserved as an idle period at the end of this subframe. As may be appreciated, the length of the idle period depends on the FBE frame period length. For example, if the frame period length is 10 ms, the idle period may be 7 OFDM symbols.

The "config 1" split pattern configuration 402 includes UL data followed by one subframe of DL data in the labeled subframe 9. For example, for the first frame period length 406, there are nine UL subframes followed by one DL subframe. As another example, for the second frame period length 408, there are four UL subframes followed by one DL subframe. Furthermore, for the third frame period length 410, there are three UL subframes followed by one DL subframe, and for the fourth frame period length 412, there is one UL subframe followed by one DL subframe.

For all configurations that include at least one subframe of DL data, subframe 9 will be used for DL data. The DL data in subframe 9 may occupy either a full subframe or a partial subframe. For example, DL data in subframe 9 occupies a full subframe if DL transmission is continued in a next frame period or if the base unit 104 does not schedule any UL transmission in the next frame period. In contrast, DL data in subframe 9 occupies a partial subframe with at least one symbol muted for the remote unit 102 to perform a CCA check and/or RX-TX switching if the base unit 104 has scheduled any UL transmissions in the next frame period.

It should be noted that there are many options available for a remote unit 102 to know whether the DL data in subframe 9 is to occupy either a full subframe or a partial subframe. In one embodiment, the DL data in subframe 9 may always occupy a partial subframe in which at least one symbol is muted to facilitate the remote unit 102 performing the CCA check and/or RX-TX switching. In another embodiment, the DL data in subframe 9 may occupy a full subframe if the uplink/downlink pattern in the next frame period includes only DL data (e.g., config 10), otherwise the DL data in subframe 9 may occupy a partial subframe. In a further embodiment, the base unit 104 may indicate to the remote unit 102 whether the DL data in subframe 9 is to occupy a full subframe or a partial subframe, such as via one-bit signaling (e.g., "0" for full DL subframe, "1" for partial DL subframe, or vice versa) in DL grant signaling.

As illustrated, there is no gap between adjacent UL and DL subframes. This may be possible because of extra timing advance when 624 Ts is used for UL transmission, which can be used for TX-RX switching by the remote unit 102.

The "config 2" split pattern configuration 402 includes, for the first frame period length 406, eight UL subframes followed by two DL subframes, for the second frame period length 408, three UL subframes followed by two DL subframes, for the third frame period length 419, two UL subframes followed by two DL subframes, and for the fourth frame period length 412, two DL subframes.

The "config 3" split pattern configuration 402 includes, for the first frame period length 406, seven UL subframes followed by three DL subframes, for the second frame period length 408, two UL subframes followed by three DL subframes, and for the third frame period length 410, one UL subframe followed by three DL subframes.

The "config 4" split pattern configuration 402 includes, for the first frame period length 406, six UL subframes followed by four DL subframes, for the second frame period length 408, one UL subframe followed by four DL subframes, and for the third frame period length 410, four DL subframes. The "config 5" split pattern configuration 402 includes, for the first frame period length 406, five UL subframes followed by five DL subframes, and for the second frame period length 408, five DL subframes.

The "config 6" split pattern configuration 402 includes, for the first frame period length 406, four UL subframes followed by six DL subframes. The "config 7" split pattern configuration 402 includes, for the first frame period length 406, three UL subframes followed by seven DL subframes. The "config 8" split pattern configuration 402 includes, for the first frame period length 406, two UL subframes followed by eight DL subframes. The "config 9" split pattern configuration 402 includes, for the first frame period length 406, one UL subframe followed by nine DL subframes. The "config 10" split pattern configuration 402 includes, for the first frame period length 406, ten DL subframes.

For UL, the possible frame period lengths may be configured by RRC signaling and the starting subframe of the frame period may be aligned with PCell subframe 0. In certain embodiments, the frame period may be indicated by a L1 signaling to facilitate adjusting the length of the FBE frame period during operating. By adjusting the length of the FBE frame period during operation, UL transmission opportunity may be improved and the overhead of the FBE idle period may be decreased, in certain embodiments.

In some embodiments, L1 signaling is transmitted in CSS of PCell in the first subframe of each frame period. In certain embodiments, the L1 signaling may be fixed in PCell subframe 0 or 5 in each radio frame for simplicity. As may be appreciated, a new FBE frame period may take effect in the next radio frame after a current frame period finishes. For the uplink/downlink split pattern, the selected uplink/downlink split pattern may also be indicated in the L1 signaling to flexibly adjust the UL and DL resource ratio. In this way, high throughput gain may be achieved due to traffic adaptation. In certain embodiments, the L1 signaling or other signaling that indicates the frame period length and the uplink/downlink split pattern is transmitted at least 4 ms before the start of a new FBE frame period.

FIG. 5 is a schematic block diagram illustrating one embodiment of at least one message 500 transmitted from a base unit 104 to a remote unit 102. In certain embodiments, the at least one message 500 includes a frame period length 502, a config number 504, and a last subframe indicator 506. The at least one message 500 may be one or more messages, even through the at least one message 500 is illustrated as being one message. In certain embodiments, the at least one message 500 may be part of L1 signaling and/or uplink/downlink grant messaging.

The frame period length 502 is used to indicate a frame period length for the next frame following the frame in which the frame period length 502 is received. As set forth above, the frame period length may be 1 ms, 2 ms, 3 ms, 4 ms, 5 ms, 6 ms, 7 ms, 8 ms, 9 ms, 10 ms, and so forth. Moreover, the frame period length 502 may be changed as often as desired to adjust the frame period length. For example, the frame period length 502 may be changed as often as each frame.

The config number 504 may be any suitable representation of one of the split pattern configurations 402. In certain embodiments, the config number 504 may be an actual number that represents a stored number corresponding to a configuration, such as the configuration numbers presented above. The last subframe indicator 506 may be any indicator used to indicate whether the last DL subframe in a DL transmission is to be a full subframe for DL transmission or a partial subframe for DL transmission. For example, in one embodiment, the last subframe indicator 506 may be a bit in DL grant signaling that indicates whether the last DL subframe in a DL transmission is to be a full subframe for DL transmission or a partial subframe for DL transmission (e.g., "0" for full DL subframe, "1" for partial DL subframe, or vice versa).

Figure 6:
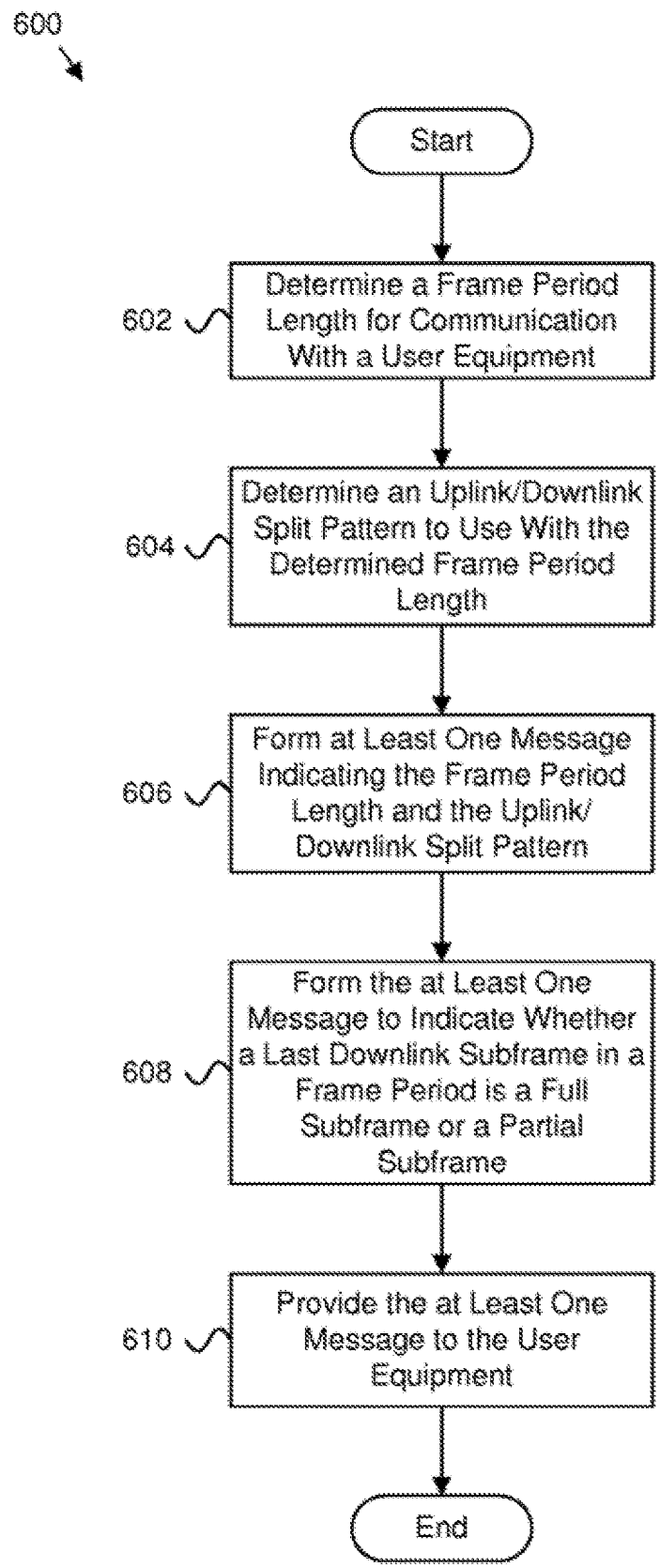
FIG. 6 is a schematic flow chart diagram illustrating one embodiment of a method for a base unit to receive flexible uplink transmissions from a remote unit and to provide flexible downlink transmissions to the remote unit.

FIG. 6 is a schematic flow chart diagram illustrating one embodiment of a method 600 for a base unit 104 to receive flexible UL transmissions from a remote unit 102 and to provide flexible DL transmissions to the remote unit 102. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 a frame period length (e.g., frame period lengths 406, 408, 410, 412) for communication with a remote unit 102 (e.g., a UE). In certain embodiments, the base unit 104 may determine 602 the frame period length for communication with the remote unit 102. In one embodiment, determining the frame period length for communication with the remote unit 102 may include selecting the frame period length from a group of frame period lengths (e.g., 1 ms, 2 ms, 3 ms, 4 ms, 5 ms, 6 ms, 7 ms, 8 ms, 9 ms, 10 ms, and so forth).

The method 600 may also include determining 604 an uplink/downlink split pattern (e.g., split pattern configurations 402) to use with the determined frame period length. In certain embodiments, the base unit 104 may determine 604 the uplink/downlink split pattern to use based on the determined frame period length. In some embodiments, determining 604 the uplink/downlink split pattern to use with the frame period length includes selecting the uplink/downlink split pattern from a group of uplink/downlink split patterns (e.g., split pattern configurations 402).

In one embodiment, the group of uplink/downlink split patterns may include: a first pattern including ten UL subframes; a second pattern including nine UL subframes followed by one DL subframe; a third pattern including eight UL subframes followed by two DL subframes; a fourth pattern including seven UL subframes followed by three DL subframes; a fifth pattern including six UL subframes followed by four DL subframes; a sixth pattern including five UL subframes followed by five DL subframes; a seventh pattern including four UL subframes followed by six DL subframes; an eighth pattern including three UL subframes followed by seven DL subframes; a ninth pattern including two UL subframes followed by eight DL subframes; a tenth pattern including one UL subframe followed by nine DL subframes; and an eleventh pattern including ten DL subframes.

In certain embodiments, each uplink/downlink split pattern includes consecutive UL subframes grouped together and consecutive DL subframes grouped together. In some embodiments, there is no gap between the UL and DL subframes. In one embodiment, the uplink/downlink split pattern is indicated in DL grant signaling or UL grant signaling to one remote unit 102, while in another embodiment, the uplink/downlink split pattern is indicated in CSS of predefined subframes of one predefined licensed carrier to more than one remote unit 102. In certain embodiments, each uplink/downlink split pattern begins with a UL subframe (if the split pattern includes a UL subframe).

The method 600 may include forming 606 at least one message (e.g., the at least one message 500) indicating the frame period length and the uplink/downlink split pattern. In some embodiments, the base unit 104 may form 606 the at least one message indicating the frame period length and the uplink/downlink split pattern. In certain embodiments, forming 606 the at least one message indicating the frame period length and the uplink/downlink split pattern includes forming an L1 signaling message indicating the frame period length and the uplink/downlink split pattern.

The method 600 may also include forming 608 the at least one message to indicate whether a last DL subframe in a frame period is a full subframe for DL transmission or a partial subframe for DL transmission. In one embodiment, the base unit 104 may form 608 the at least one message to indicate whether the last DL subframe in the frame period is a full subframe for DL transmission or a partial subframe for DL transmission. In certain embodiments, a DL grant message includes a bit to indicate whether the last DL subframe in the frame period is a full subframe for DL transmission or a partial subframe for DL transmission. In some embodiments, the method 600 may include determining whether the last DL subframe in the frame period is a full subframe for DL transmission or a partial subframe for DL transmission. In one embodiment, the last DL subframe in the frame period is determined to be a full subframe for DL transmission if a first subframe in a next frame period that follows the frame period is a DL subframe and the last DL subframe in the frame period is determined to be a partial subframe for DL transmission if the first subframe in the next frame is a UL subframe.

The method 600 may provide 610 the at least one message to the remote unit 102. Then the method 600 may end. In certain embodiments, the transmitter 310 of the base unit 104 may provide 610 the at least one message to the remote unit 102. In one embodiment, providing 610 the at least one message to the remote unit 102 may include providing the at least one message to the remote unit 102 at least four ms before a first subframe in a frame period that is to implement the frame period length and the uplink/downlink split pattern.

Figure 7:
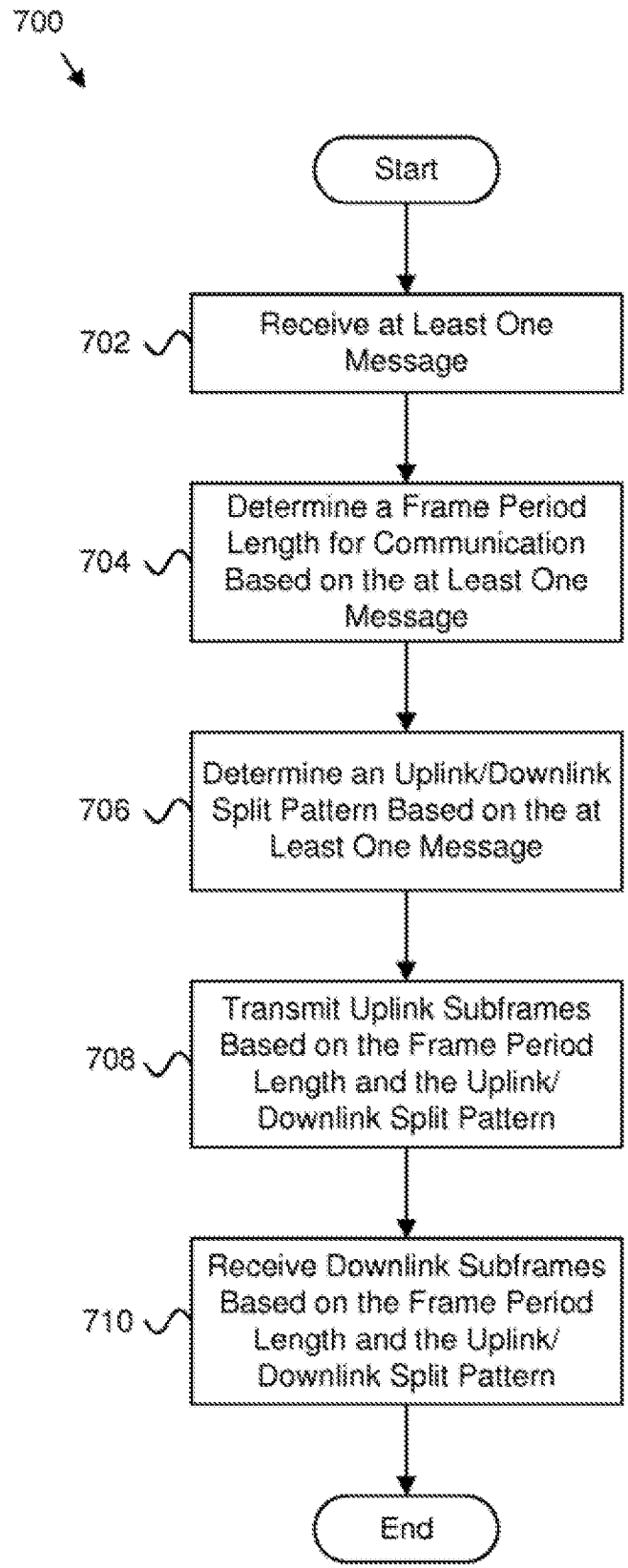
FIG. 7 is a schematic flow chart diagram illustrating one embodiment of a method for a remote unit to receive flexible downlink transmission from a base unit and to provide flexible uplink transmissions to the base unit.

FIG. 7 is a schematic flow chart diagram illustrating one embodiment of a method 700 for a remote unit 102 to receive flexible DL transmissions from a base unit 104 and to provide flexible UL transmissions to the base unit 104. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 at least one message (e.g., the at least one message 500). In one embodiment, the receiver 212 of the remote unit 102 may receive the at least one message. The method 700 may also include determining 704 a frame period length (e.g., frame period lengths 406, 408, 410, 412) for communication based on the at least one message. In one embodiment, the remote unit 102 determines 704 the frame period length for communication based on the at least one message.

The method 700 may include determining 706 an uplink/downlink split pattern (e.g., split pattern configurations 402) based on the at least one message. In certain embodiments, the remote unit 102 may determine 706 the uplink/downlink split pattern based on the at least one message. In one embodiment, the uplink/downlink split pattern includes consecutive UL subframes grouped together and consecutive DL subframes grouped together. In certain embodiments, there is no gap between the UL subframes and the DL subframes. In some embodiments, the uplink/downlink split pattern is indicated in DL grant signaling or UL grant signaling to one remote unit 102, while in other embodiments, the uplink/downlink split pattern is indicated in CSS of predefined subframes of one predefined licensed carrier to more than one remote unit 102. In one embodiment, the at least one message indicates whether a last DL subframe in a frame period is a full subframe for DL transmission or a partial subframe for DL transmission.

The method 700 may include transmitting 708 UL subframes based on the frame period length and the uplink/downlink split pattern. In certain embodiments, the transmitter 210 of the remote unit 102 may transmit 708 UL subframes based on the frame period length and the uplink/downlink split pattern. The method 700 may also include receiving 710 DL subframes based on the frame period length and the uplink/downlink split pattern. Then the method 700 may end. In one embodiment, the receiver 212 may receive 710 DL subframes based on the frame period length and the uplink/downlink split pattern.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor;
a memory that stores code executable by the processor, the code comprising:
code that determines a frame period length for communication with a user equipment;
code that determines an uplink/downlink split pattern to use with the determined frame period length; and
code that forms at least one message comprising first information that indicates the frame period length and second information comprising an indicator that identifies the uplink/downlink split pattern out of a plurality of predetermined uplink/downlink split patterns, wherein the first information is different from the second information; and
a transmitter that provides the at least one message to the user equipment.

2. The apparatus of claim 1, wherein the code that determines the frame period length for communication with the user equipment comprises code that selects the frame period length from a plurality of frame period lengths.

3. The apparatus of claim 1, wherein the code that determines the uplink/downlink split pattern to use with the frame period length comprises code that selects the uplink/downlink split pattern from the plurality of predetermined uplink/downlink split patterns.

4. The apparatus of claim 3, wherein each uplink/downlink split pattern of the plurality of predetermined uplink/downlink split patterns comprises consecutive uplink subframes grouped together followed by consecutive downlink subframes grouped together with no gap between the uplink subframes and the downlink sub frames.

5. The apparatus of claim 1, wherein the at least one message comprises a downlink grant message having a bit that indicates whether a last downlink subframe in a frame period is a full subframe for downlink transmission or a partial subframe for downlink transmission.

6. A method comprising:
determining, by use of a processor, a frame period length for communication with a user equipment;
determining an uplink/downlink split pattern to use with the determined frame period length;
forming at least one message comprising first information that indicates the frame period length and second information comprising an indicator that identifies the uplink/downlink split pattern out of a plurality of predetermined uplink/downlink split patterns, wherein the first information is different from the second information; and
providing the at least one message to the user equipment.

7. The method of claim 6, wherein determining the frame period length for communication with the user equipment comprises selecting the frame period length from a plurality of frame period lengths.

8. The method of claim 6, wherein determining the uplink/downlink split pattern to use with the frame period length comprises selecting the uplink/downlink split pattern from the plurality of predetermined uplink/downlink split patterns.

9. The method of claim 8, wherein each uplink/downlink split pattern of the plurality of predetermined uplink/downlink split patterns comprises consecutive uplink subframes grouped together and consecutive downlink subframes grouped together without a gap between the uplink and downlink subframes.

10. The method of claim 9, wherein the uplink/downlink split pattern is indicated in downlink grant signaling or uplink grant signaling to one user equipment or in common search space of predefined subframes of one predefined licensed carrier to more than one user equipment.

11. The method of claim 8, wherein each uplink/downlink split pattern of the plurality of predetermined uplink/downlink split patterns begins with an uplink subframe.

12. The method of claim 8, wherein the plurality of predetermined uplink/downlink split patterns comprises:
a first pattern comprising ten uplink subframes;
a second pattern comprising nine uplink subframes followed by one downlink subframe;

a third pattern comprising eight uplink subframes followed by two downlink subframes;

a fourth pattern comprising seven uplink subframes followed by three downlink subframes;

a fifth pattern comprising six uplink subframes followed by four downlink subframes;

a sixth pattern comprising five uplink subframes followed by five downlink subframes;

a seventh pattern comprising four uplink subframes followed by six downlink subframes;

an eighth pattern comprising three uplink subframes followed by seven downlink subframes;

a ninth pattern comprising two uplink subframes followed by eight downlink subframes;

a tenth pattern comprising one uplink subframe followed by nine downlink subframes; and an eleventh pattern comprising ten downlink subframes.

13. The method of claim 6, wherein forming the at least one message comprises forming an L1 signaling message comprising the second information and forming a radio resource control signaling message comprising the first information.

14. The method of claim 6, comprising forming the at least one message to indicate whether a last downlink subframe in a frame period is a full subframe for downlink transmission or a partial subframe for downlink transmission.

15. The method of claim 14, comprising determining whether the last downlink subframe in the frame period is a full subframe for downlink transmission or a partial subframe for downlink transmission, wherein the last downlink subframe in the frame period is determined to be a full subframe for downlink transmission if a first subframe in a next frame period that follows the frame period is a downlink subframe and the last downlink subframe in the frame period is determined to be a partial subframe for downlink transmission if the first subframe in the next frame is an uplink subframe.

16. An apparatus comprising:
a receiver that receives at least one message;
a processor;
a memory that stores code executable by the processor, the code comprising:
  code that determines a frame period length for communication based on the at least one message; and
  code that determines an uplink/downlink split pattern based on the at least one message, wherein the at least one message comprises first information that indicates the frame period length and second information comprising an indicator that identifies the uplink/downlink split pattern out of a plurality of predetermined uplink/downlink split patterns, and the first information is different from the second information; and
a transmitter that transmits uplink subframes based on the frame period length and the uplink/downlink split pattern;
wherein the receiver receives downlink subframes based on the frame period length and the uplink/downlink split pattern.

17. A method comprising:
receiving, by use of a processor, at least one message;
determining a frame period length for communication based on the at least one message;
determining an uplink/downlink split pattern based on the at least one message, wherein the at least one message comprises first information that indicates the frame period length and second information comprising an indicator that identifies the uplink/downlink split pattern out of a plurality of predetermined uplink/downlink split patterns, and the first information is different from the second information;
transmitting uplink subframes based on the frame period length and the uplink/downlink split pattern; and
receiving downlink subframes based on the frame period length and the uplink/downlink split pattern.

18. The method of claim 17, wherein the uplink/downlink split pattern comprises consecutive uplink subframes grouped together and consecutive downlink subframes grouped together with no gap between the uplink subframes and the downlink subframes.

19. The method of claim 17, wherein the at least one message indicates whether a last downlink subframe in a frame period is a full subframe for downlink transmission or a partial subframe for downlink transmission.

20. The method of claim 17, wherein the uplink/downlink split pattern is indicated in downlink grant signaling or uplink grant signaling to one user equipment or in common search space of predefined subframes of one predefined licensed carrier to more than one user equipment.

* * * * *